(12) United States Patent
Woody et al.

(10) Patent No.: US 6,488,345 B1
(45) Date of Patent: Dec. 3, 2002

(54) REGENERATIVE BRAKING SYSTEM FOR A BATTERILESS FUEL CELL VEHICLE

(75) Inventors: George R. Woody, Wiesbaden (DE); Martin Fasse, Wiesbaden (DE); Peter Willimowski, Darmstadt (DE)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/931,508

(22) Filed: Aug. 16, 2001

(51) Int. Cl.[7] .............................. B60T 8/00; B60K 1/00
(52) U.S. Cl. ..................... 303/152; 701/22; 180/65.3; 180/165; 188/158; 429/13; 303/20; 303/3
(58) Field of Search ................................. 303/152, 2–3, 303/20; 701/22; 180/165, 65.1–65.8, 197; 429/17, 9, 12, 13, 19, 34, 218.2, 24–26; 318/139, 376; 320/101, 104, 147; 60/413, 414; 188/156, 158

(56) References Cited

U.S. PATENT DOCUMENTS

| | | | |
|---|---|---|---|
| 3,657,625 A | | 4/1972 | Miller et al. |
| 4,419,610 A | | 12/1983 | Pollman |
| 4,489,242 A | | 12/1984 | Worst |
| 4,733,146 A | | 3/1988 | Hamby |
| 5,311,739 A | * | 5/1994 | Clark |
| 5,345,761 A | | 9/1994 | King et al. |
| 5,558,173 A | | 9/1996 | Sherman |
| 5,771,476 A | * | 6/1998 | Mufford et al. ............... 701/22 |
| 5,878,360 A | | 3/1999 | Nishino et al. |
| 5,971,092 A | | 10/1999 | Walker |
| 5,998,885 A | | 12/1999 | Tamor et al. |
| 6,036,449 A | * | 3/2000 | Nishar et al. |
| 6,122,588 A | | 9/2000 | Shehan et al. |
| 6,186,254 B1 | | 2/2001 | Mufford et al. |
| 6,321,145 B1 | * | 11/2001 | Rajashekara ............... 180/65.3 |
| 2001/0053950 A1 | * | 12/2001 | Hasegawa et al. ............ 701/22 |
| 2002/0064695 A1 | * | 5/2002 | Raiser |

* cited by examiner

*Primary Examiner*—Douglas C. Butler
(74) *Attorney, Agent, or Firm*—Karl F. Barr, Jr.; Cary W. Brooks; Linda M. Deschere

(57) ABSTRACT

A regenerative braking system and method for a batteriless fuel cell vehicle includes a fuel cell stack, a plurality of ancillary loads, and a regenerative braking device that is coupled to at least one wheel of the vehicle. The regenerative braking device powers ancillary loads when the vehicle is coasting or braking. The fuel cell powers the loads when the vehicle is accelerating or at constant velocity. The regenerative braking device dissipates power in an air supply compressor when the vehicle is traveling downhill to provide brake assistance. The compressor can be run at high airflow and high pressure to create an artificially high load. A bypass valve is modulated to adjust the artificially high load of the compressor. A back pressure valve protects the fuel cell stack from the high airflow and pressure. A controller controls a brake torque of the regenerative braking device as a function of vehicle speed and modulates the bypass valve.

25 Claims, 7 Drawing Sheets

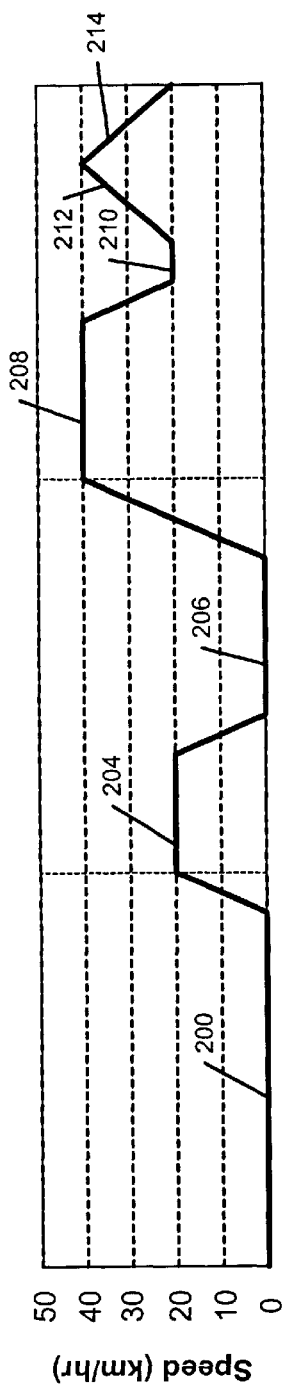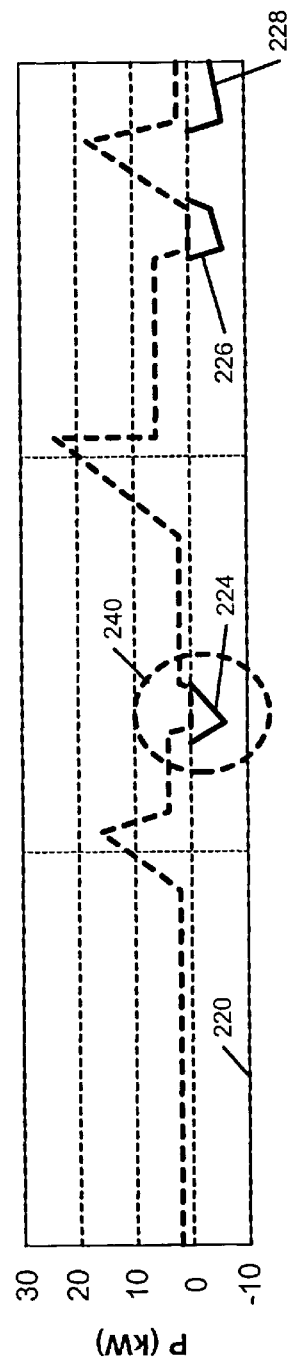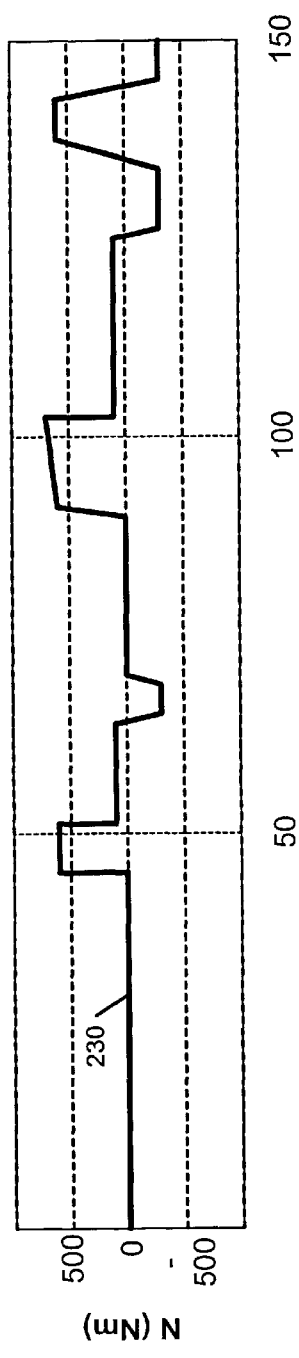

REGENERATIVE BRAKING SYSTEM FOR A BATTERILESS FUEL CELL VEHICLE

FIELD OF THE INVENTION

The present invention relates to fuel cells, and more particularly to fuel cells that employ regenerative braking.

BACKGROUND OF THE INVENTION

Fuel cell systems are increasingly being used as a power source in a wide variety of applications. Fuel cell systems have also been proposed for use in vehicles as a replacement for internal combustion engines. A solid-polymer-electrolyte fuel cell includes a membrane that is sandwiched between an anode and a cathode. To produce electricity through an electrochemical reaction, hydrogen ($H_2$) is supplied to the anode and oxygen ($O_2$) is supplied to the cathode. The source of the hydrogen is typically pure hydrogen, reformed methanol, or other reformed hydrocarbon fuels.

In a first half-cell reaction, dissociation of the hydrogen ($H_2$) at the anode generates hydrogen protons ($H^+$) and electrons ($e^-$). The membrane is proton conductive and dielectric. As a result, the protons are transported through the membrane while the electrons flow through an electrical load that is connected across the membrane. The electrical load is typically a motor that drives the wheels of the vehicle or storage batteries. In a second half-cell reaction, oxygen ($O_2$) at the cathode reacts with protons ($H^+$), and electrons ($e^-$) are taken up to form water ($H_2O$). Therefore, fuel cell vehicles have little or no emissions.

Internal combustion engine vehicles and hybrid vehicles sometimes employ regenerative braking to improve the efficiency of the vehicle. In non-regenerative braking vehicles, the torque produced by the brakes causes friction that slows the wheels of the vehicle. The friction creates waste heat that increases the temperature of the brakes. Regenerative braking devices convert mechanical brake torque that occurs during vehicle deceleration into power. The energy that is produced by the brake torque is typically used to recharge a battery pack that powers vehicle accessory loads such as the lights, radio, pumps, air conditioner, fans, and other devices.

In U.S. Pat. No. 4,489,242 to Worst, a vehicle power system includes an internal combustion engine and a regenerative braking device that charges a battery pack. The battery pack powers one or more vehicle accessories such as vehicle lights, power steering and brake pumps, air conditioner, radiator fan, water pump, etc. In U.S. Pat. No. 5,345,761 to King et al., regenerative braking is used to power a high-voltage, electrically-heated catalyst that treats the exhaust gas of an internal combustion engine. In U.S. Pat. No. 6,122,588, regenerative braking is used to supply power to increase fuel efficiency and/or to power various electrical loads such as vehicle accessories.

Regenerative braking is generally provided by a motor/generator that opposes the rotation of the wheels by applying a negative or regarding torque to the wheels of the vehicle. Because the negative torque decelerates the vehicle and is often used to assist the brakes, regenerative braking systems generally reduce the wear on the brakes of the vehicle, which reduces maintenance costs.

Because fuel cell vehicles are relatively new in the automotive arena, current fuel cells do not produce as much power as internal combustion engines. Fuel cell vehicles are also more expensive than internal combustion engines. Before widespread acceptance of fuel cells will occur, these performance and cost issues must be resolved. The performance of the fuel cell is related to the weight of the fuel cell. Because of the increased weight and cost of battery packs and DC/DC converters that are required in regenerative braking systems, fuel cell have not implemented regenerative braking systems.

SUMMARY OF THE INVENTION

A regenerative braking system and method for a batteriless fuel cell vehicle includes a fuel cell stack, an ancillary load, and a regenerative braking device that is coupled to at least one wheel of the vehicle. The regenerative braking device powers the ancillary load when the vehicle is coasting or braking. The fuel cell powers the ancillary load when the vehicle is accelerating or at constant velocity.

In other features of the invention, the regenerative braking system includes an air compressor. The regenerative braking device dissipates power in the air compressor when the vehicle is traveling downhill to provide brake assistance. A bypass valve has an inlet connected to the air compressor. When the vehicle is traveling downhill, the air compressor is run at high airflow and high pressure to create an artificial load. The bypass valve is modulated to adjust the artificial load of the air compressor.

In still other features of the invention, the regenerative braking device is an electric traction system. A back pressure valve is connected to a cathode of the fuel cell stack. The back pressure valve protects the fuel cell stack from the high airflow and pressure. A controller controls a brake torque of the regenerative braking device as a function of vehicle speed and modulates the bypass valve to vary the artificial load.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 5A, 5B and 5C are waveforms that illustrate regenerative braking in the batteriless fuel cell system of FIG. 3;

DETAILED DESCRIPTION OF THE PREFERRED EMBODIMENTS

The following description of the preferred embodiment(s) is merely exemplary in nature and is in no way intended to limit the invention, its application, or uses.

Figure 1:
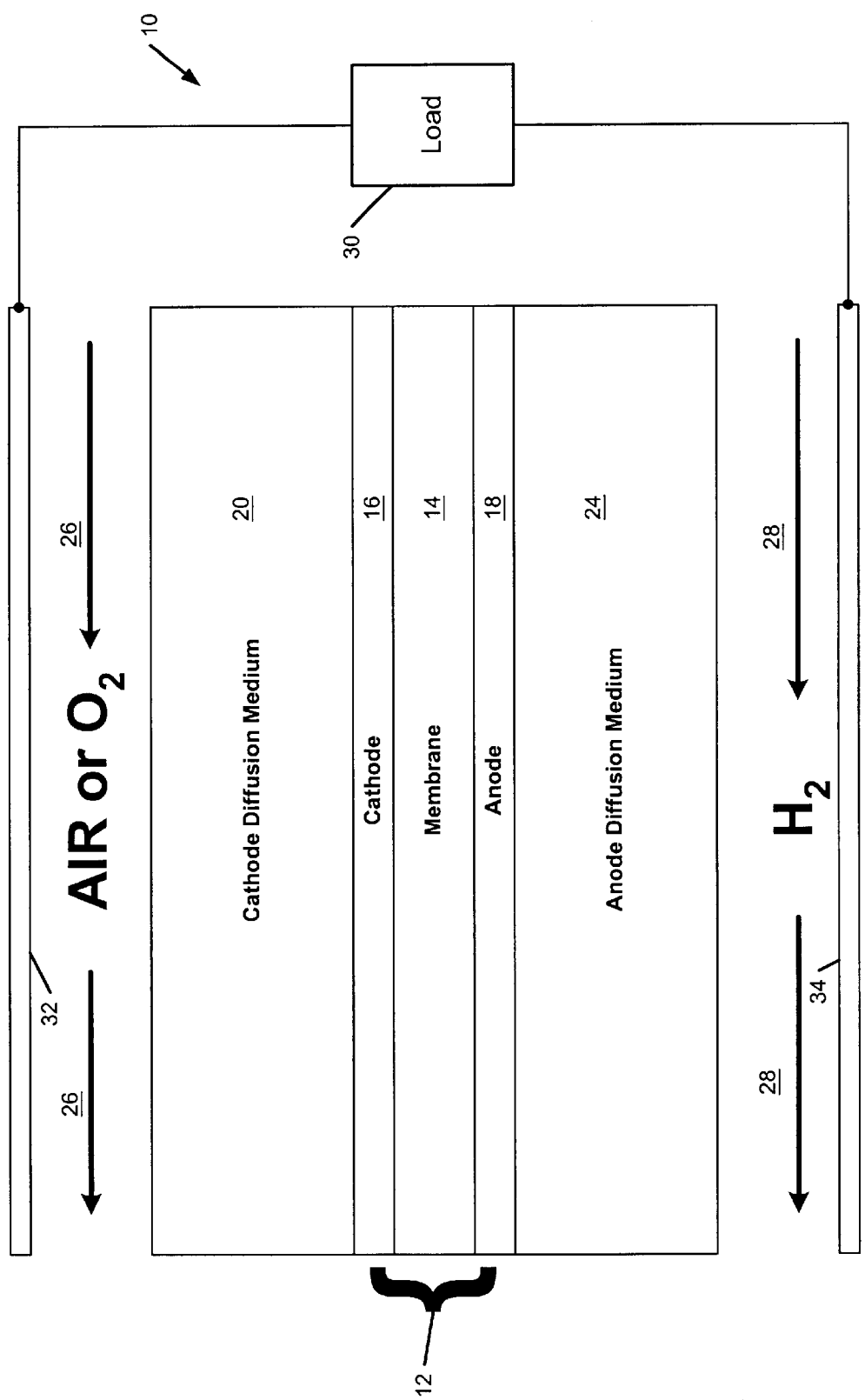
FIG. 1 illustrates a cross-section of a membrane electrode assembly of an exemplary fuel cell; 4

Referring now to FIG. 1, a cross-section of a fuel cell assembly 10 that includes a membrane electrode assembly (MEA) 12 is shown. Preferably, the MEA 12 is a proton exchange membrane (PEM). The MEA 12 includes a membrane 14, a cathode 16, and an anode 18. The membrane 14 is sandwiched between an inner surface of the cathode 16 and an inner surface of the anode 18.

A cathode diffusion medium 20 is located adjacent to an outer surface of the cathode 16. An anode diffusion medium 24 is located adjacent to an outer surface of the anode 18. The fuel cell assembly 10 further includes a cathode flow line 26 and anode flow line 28. The cathode flow line 26 receives and directs oxygen ($O_2$) or air from a source to the cathode diffusion medium 20. The anode flow line 28 receives and directs hydrogen ($H_2$) or reformate from a source to the anode diffusion medium 24. Skilled artisans will appreciate that the source of hydrogen is preferably pure hydrogen, reformed methanol, a reformed hydrocarbon fuel, or any other suitable hydrogen source.

In the fuel cell assembly 10, the membrane 14 is a cation permeable, proton conductive membrane having H+ ions as the mobile ion. The fuel gas is hydrogen ($H_2$) and the oxidant is oxygen ($O_2$). The overall cell reaction is the oxidation of hydrogen to water and the respective reactions at the anode 18 and the cathode 16 are as follows:

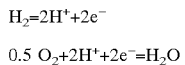

$$H_2 = 2H^+ + 2e^-$$

$$0.5\ O_2 + 2H^+ + 2e^- = H_2O$$

Since hydrogen is used as the fuel gas, the product of the overall cell reaction is water. Typically, the water that is produced is rejected at the cathode 16, which is a porous electrode including an electrocatalyst layer on the oxygen side. The water may be collected as it is formed and carried away from the MEA 12 of the fuel cell assembly 10 in any conventional manner. The cell reaction produces a proton exchange in a direction from the anode diffusion medium 24 towards the cathode diffusion medium 20. In this manner, the fuel cell assembly 10 produces electricity. An electrical load 30 such as a motor, vehicle accessories, or other device is electrically connected to the MEA 12 to a plate 32 and a plate 34. If the plates 32 and 34 are adjacent to another fuel cell, the plates 32 and/or 34 are bipolar. If another fuel cell is not adjacent, the plates 32 and/or 34 are end plates.

Figure 2:
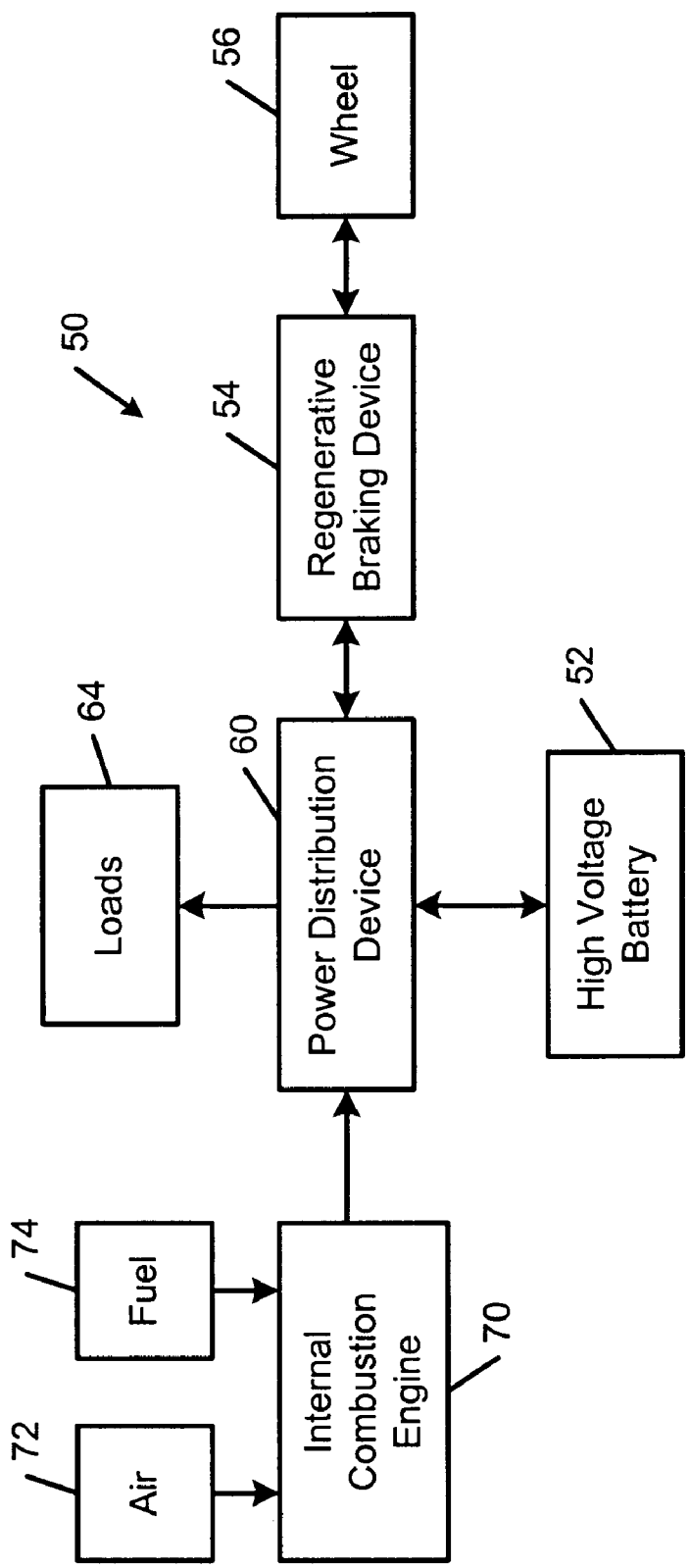
FIG. 2 (prior art) is a functional block diagram illustrating an internal combustion engine with batteries and a regenerative braking device.

Referring now to FIG. 2, a vehicle 50 that includes a storage battery 52 is shown. A regenerative braking device 54 is coupled to one or more wheels 56 of the vehicle 50. The regenerative braking device 54 generates power when the vehicle coasts (causing slight deceleration), is traveling downhill, and/or when the driver applies the brakes (to decelerate the vehicle). A power distribution device 60 such as a high-voltage bus distributes the power that is generated by the regenerative braking device 54. The power distribution device 60 distributes power directly to one or more loads 64 and/or recharges the storage battery 52 depending upon the circumstances.

When the driver depresses the accelerator, an internal combustion engine 70 generates power from air 72 and fuel 74 that is supplied to the engine 70. When the vehicle is coasting or braking to reduce speed, the regenerative braking device 54 generates power that can be used to charge the storage battery 52 and/or to power the loads 64. Oftentimes, the storage battery 52 provides power to the accessories at lower speeds and when the vehicle is stopped to improve fuel efficiency of the vehicle.

Figure 3:
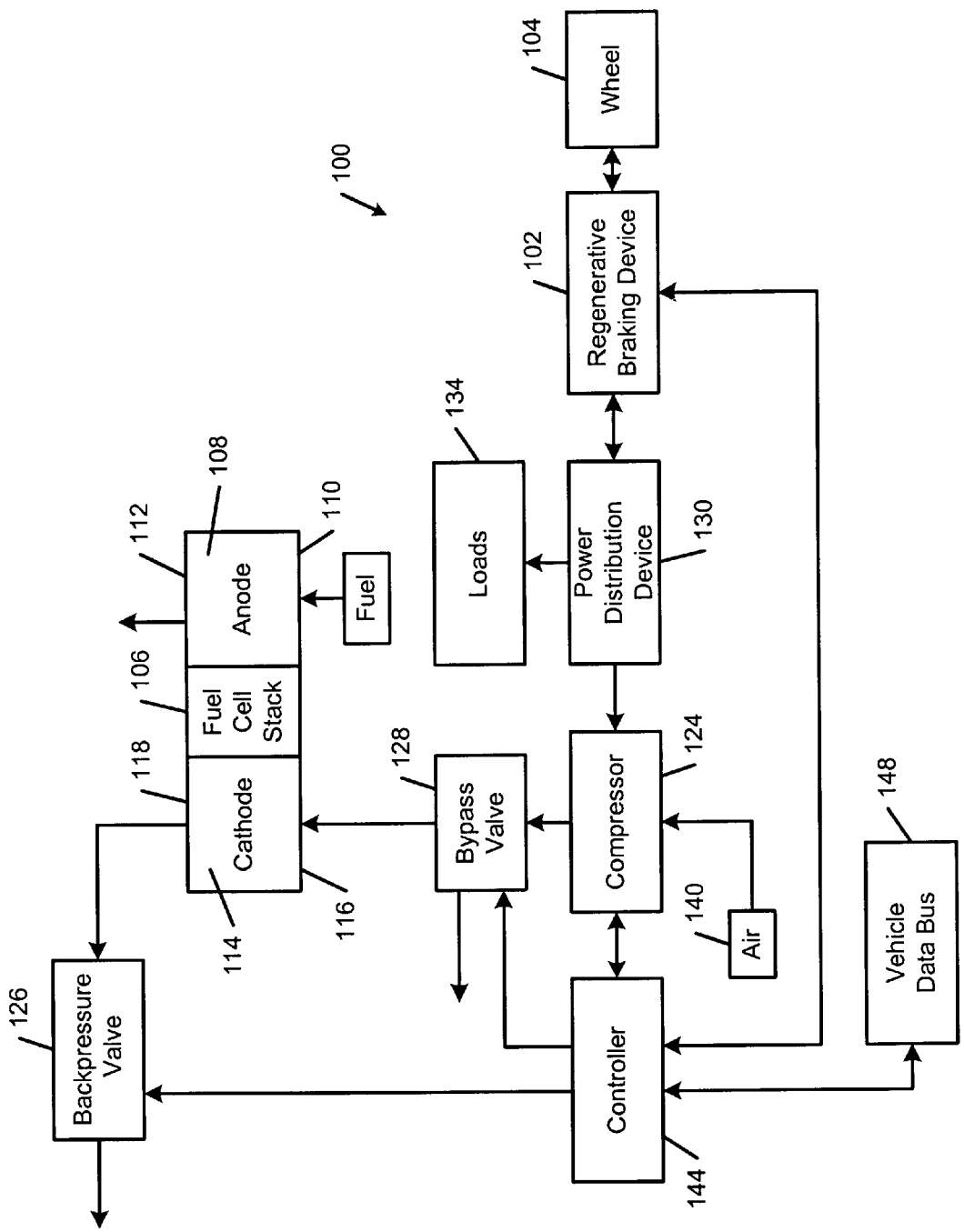
FIG. 3 is a functional block diagram showing a batteriless fuel cell system with a regenerative braking device in accordance with the present invention.

Referring now to FIG. 3, a regenerative braking system for a batteriless fuel cell vehicle is shown and is generally designated 100. The regenerative braking system 100 includes a regenerative braking device 102 that is coupled to at least one wheel 104 of the fuel cell vehicle. The regenerative braking device 102 is preferably an electric traction system. The regenerative braking system 100 includes a fuel cell stack 106 that includes an anode flowline with an inlet 110 and an outlet 112. The fuel cell 106 also includes a cathode flowline 114 with an inlet 116 and outlet 118.

The regenerative braking system 100 further includes an air compressor 124, a back pressure valve 126 and a bypass valve 128. The bypass valve 128 is connected to an outlet of the air compressor 124, a cathode of the fuel cell stack 106 and to the environment. A power output of the regenerative braking device 102 is connected to a power distribution device 130 that is connected to loads 134. The loads 134 preferably include fans, pumps, an air conditioning compressor, heaters, 12 volt battery, and other devices. The brake torque (and energy) provided by the regenerative braking device 102 is preferably set as a function of vehicle speed.

The air compressor 124 pressurizes supply air 140 and outputs the pressurized air to the bypass valve 128. A controller 144 is connected to the back pressure valve 126, the bypass value 128, the compressor 124, and a vehicle data bus 148. The controller 144 modulates the bypass valve 128 to selectively divert the air to the inlet 116 of the cathode flowline 114, to exhaust the air and/or to direct the air to another device.

During normal driving when the vehicle's speed is greater than zero and the vehicle is not accelerating or when the vehicle is at constant velocity, the regenerative braking device 102 produces power and the loads 134 dissipate the energy. During braking and coasting, air and fuel to the fuel cell stack 106 are preferably shut off and no fuel consumption occurs. As a result, the output of the fuel cell stack is 0 kW during braking and coasting.

When driving downhill (detected by monitoring vehicle acceleration and the position of the accelerator pedal through the vehicle data bus 148), the regenerative braking device 102 powers the ancillary loads. In a highly preferred mode, the controller 144 runs the compressor with high airflow and high pressure to create an artificial loss. During this condition, the back pressure valve 126 is either closed or partially opened (if additional power is required from the fuel cell stack). The controller 144 controls the back pressure valve 126 to prevent the high pressure air that is generated by the air compressor 124 from reaching the fuel cell stack 106. The controller 144 modulates the bypass valve 128 to regulate a compressor load of the air compressor 124 and to regulate the brake torque of the regenerative braking device 102.

Figure 4:
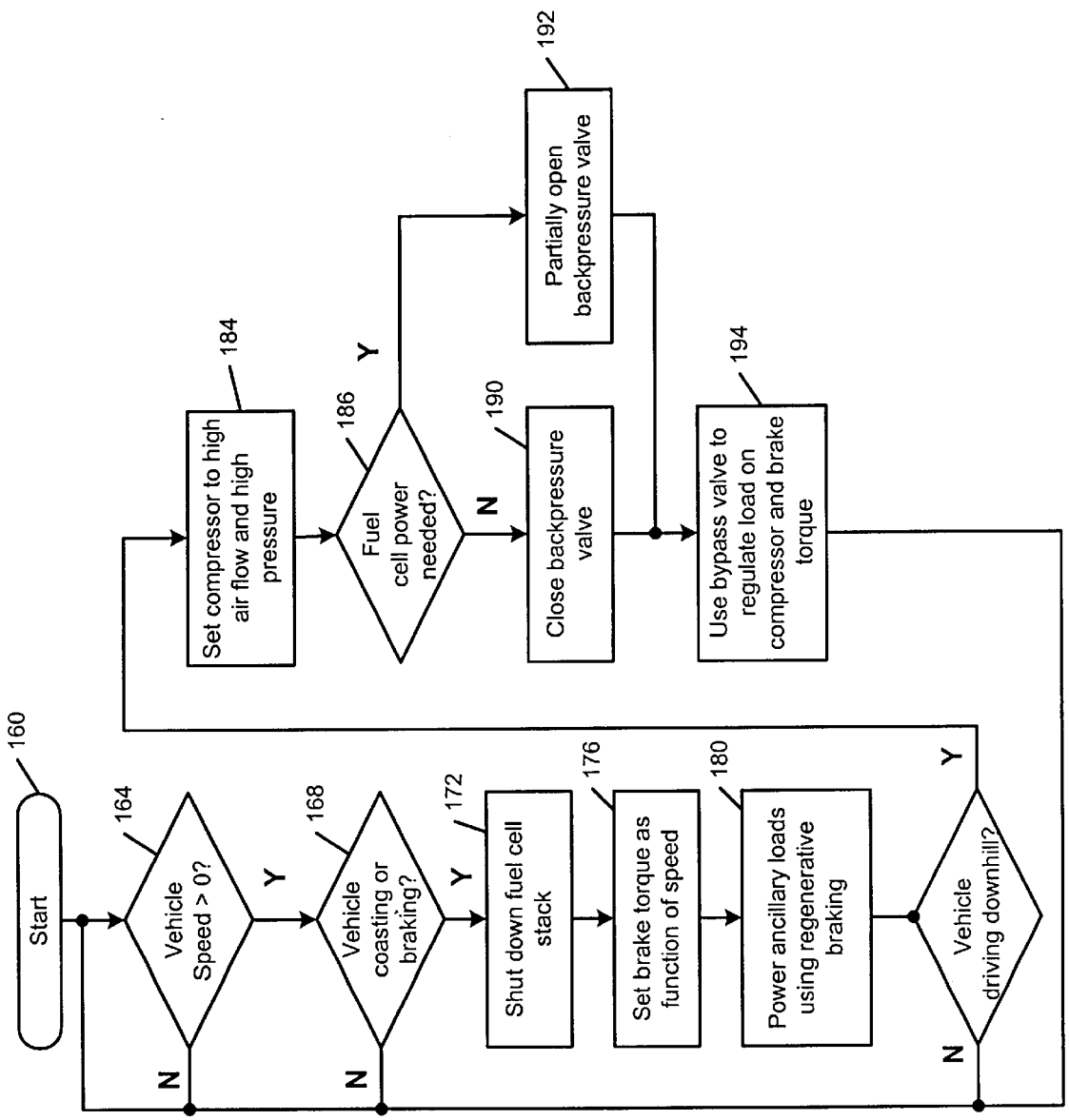
FIG. 4 illustrates steps for operating the batteriless fuel cell system of FIG. 3.

Referring now to FIG. 4, steps for operating the controller 144 are shown. Control begins with step 160. In step 164, the controller 144 determines whether the speed of the vehicle exceeds 0 km/hr. In other words, the controller 144 determines whether the vehicle is moving. If not, control loops to step 164. Otherwise, control continues with step 168 where the controller 144 determines whether the vehicle is coasting or braking. If not, control loops to step 164. Otherwise, the controller 144 continues with step 172 where the fuel cell stack 106 is shut down by cutting off air and fuel that is supplied to the fuel cell stack 106. In step 176, the brake torque is set as a function of the speed of the vehicle. In step 180, the loads 134 are powered using the regenerative braking.

In step 184, the controller 144 determines whether the vehicle is driving downhill by monitoring the position of the accelerator pedal and the speed or acceleration of the vehicle via the vehicle data bus 148. If the vehicle is not driving downhill, control loops to step 164. Otherwise, control continues with step 184. In step 184, the controller 144 sets the compressor 124 to a high airflow and high pressure setting to create an artificial loss that dissipates the energy produced by the regenerative braking (and that provides brake assist). In step 186, control determines whether power is needed from the fuel cell stack 106. If not, the controller 144 closes the back pressure valve 126 in step 190. If power from the fuel cell is needed, the controller 144 modulates the back pressure valve 126 accordingly in step 192.

Control continues from steps 190 and 192 to step 194. In step 194, the controller 144 uses the bypass valve 128 to regulate the load of the air compressor 124 and to regulate brake torque of the regenerative braking device 102. Control continues from step 194 to step 164.

Referring now to FIG. 5A, 5B and 5C, exemplary waveforms depicting the vehicle speed, gross power, regenerative power, and mechanical torque at the axle of the fuel cell vehicle is shown. In FIG. 5A, vehicle speed increases from zero (at 200) to 20 km/hr (at 204). Subsequently, the vehicle decelerates back to zero (at 206) and then accelerates to 40 km/hr (at 208). The vehicle decelerates to 20 km/hr (at 210), accelerates to 40 km/hr (at 212), and then decelerates to 20 km/hr (at 214). In FIG. 5B, the gross power is shown with a dotted line (at 220). Regenerative power is shown with the solid lines 224, 226, and 228. The regenerative power occurs when the vehicle is coasting or braking. In FIG. 5C, the mechanical torque at the axle is illustrated by solid line 230. The torque occurs when the vehicle is accelerating, at constant velocity, coasting (due to the regenerative brake device) or braking.

Figure 6:
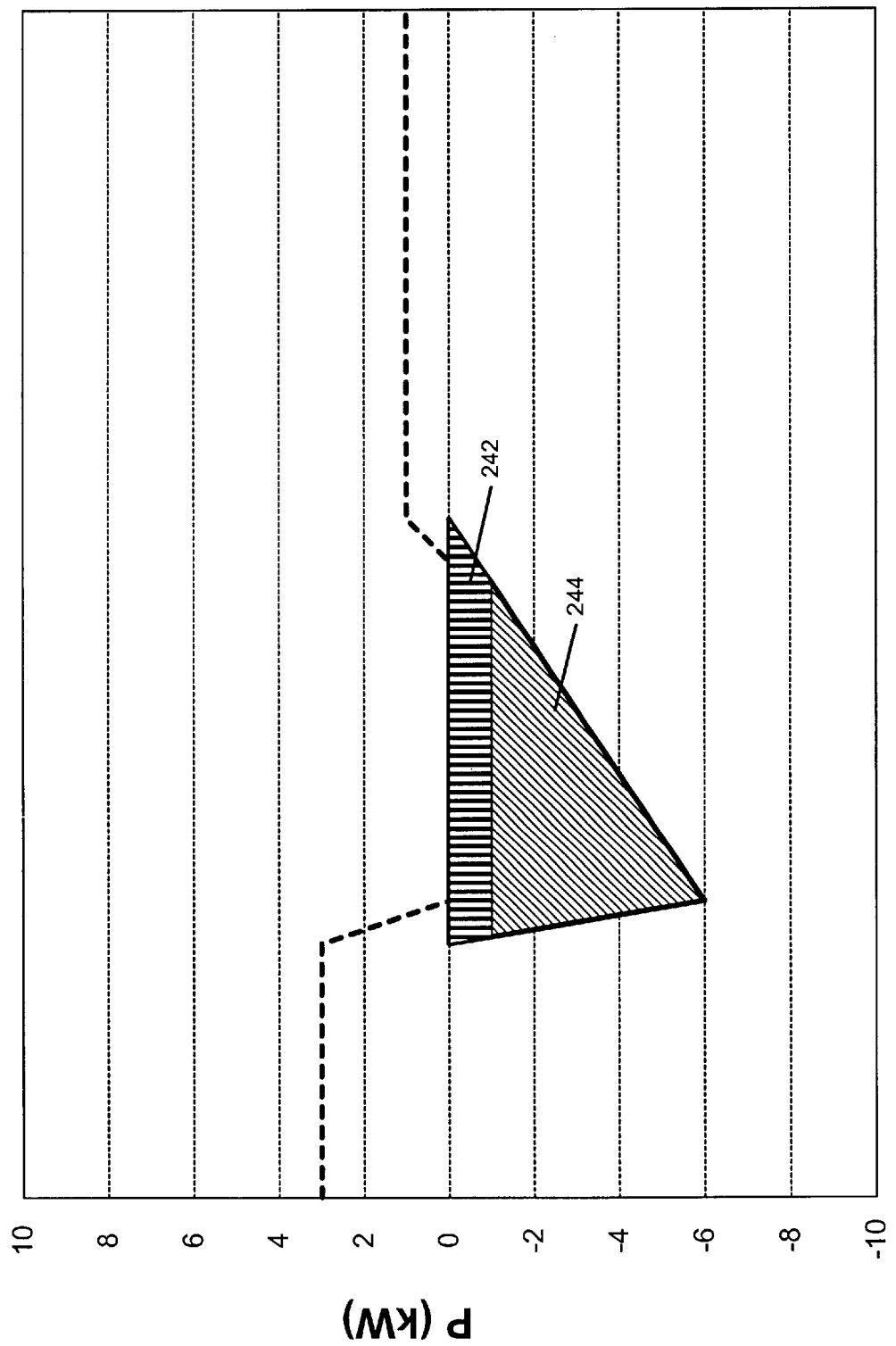
FIG. 6 are waveforms that illustrate gross power and regenerative power of a portion of the waveform in FIG. 5 in further detail.

Referring now to FIG. 6, the gross power and regenerative power for the area identified by the circular dotted line 240 in FIG. 5B is shown in further detail. The power represented by the first region 242 is used to power the loads. The power represented by the second region 244 is used for driver feel or feedback. The batteriless regenerative braking system according to the present invention significantly reduces the weight and cost of the fuel cell vehicle while providing sufficient power to the loads during vehicle coasting and braking using existing components. When traveling downhill, the compressor is run at high pressure and high airflow to create an artificial load and to provide brake assistance. Skilled at artisans will appreciate that the batteriless fuel cell vehicle may include a smaller battery (that does not power the electric motor driving the wheels) that powers the accessories while the vehicle is stopped.

Figure 7:
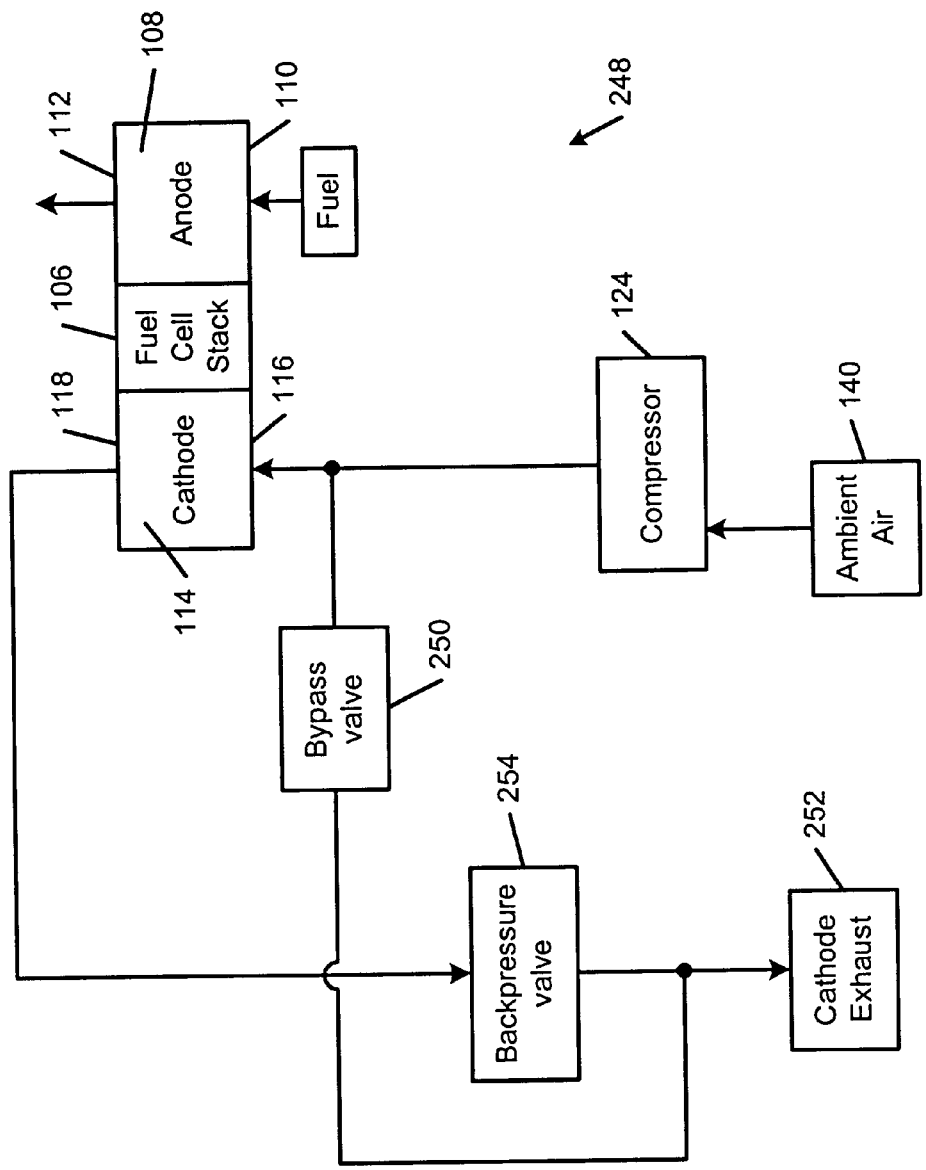
FIG. 7 shows an exemplary alternate position for a bypass valve and a backpressure valve.

Referring now to FIG. 7, the three-way bypass valve 128 of FIG. 3 can be replaced by an alternate system 248 that is shown in FIG. 7. An inlet of a two-way bypass valve 250 is connected to the inlet 116 of the cathode 114 and to an outlet of the compressor 124. An outlet of the bypass valve 250 is connected to a cathode exhaust 252. A backpressure valve 254 has an inlet connected to the outlet 118 of the cathode 114 and an outlet connected to the cathode exhaust. The alternate system 248 creates an artificial load by opening the bypass valve 250 and by closing the backpressure valve 254. The cathode side of the fuel cell stack 106 is now at high pressure during operation of the artificial compressor load. Other advantages include the use of a two-way valve that is typically less expensive than the three-way bypass valve. Skilled artisans will appreciate that the bypass and backpressure valves can be positioned in other locations without departing from the spirit and scope of the invention.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A regenerative braking system for a batteriless fuel cell vehicle, comprising:

a fuel cell stack;

an ancillary load; and a regenerative braking device coupled to at least one wheel of said vehicle, wherein said regenerative braking device powers said ancillary load when said vehicle is coasting or braking and wherein said fuel cell powers said ancillary load when said vehicle is accelerating or traveling at a constant velocity.

2. The regenerative braking system of claim 1 wherein said ancillary load is selected from the group of fans, pumps, airconditioning compressor, cabin heater, 12 volt battery, and an air compressor for said fuel cell stack.

3. The regenerative braking system of claim 1 further comprising an air compressor for said fuel cell stack.

4. The regenerative braking system of claim 3 further comprising a bypass valve.

5. The regenerative braking system of claim 4 wherein when said vehicle is traveling downhill, said air compressor is run at high airflow and high pressure to create an artificially high ancillary load and said bypass valve is modulated to vary said artificially high ancillary load of said air compressor to provide brake assistance.

6. The regenerative braking system of claim 5 further comprising a back pressure valve that protects said fuel cell stack from said high airflow and said high pressure.

7. The regenerative braking system of claim 5 further comprising a controller.

8. The regenerative braking system of claim 7 wherein said controller controls a brake torque of said regenerative braking device as a function of vehicle speed.

9. The regenerative braking system of claim 7 wherein said controller modulates said bypass valve.

10. The regenerative braking system of claim 1 wherein said regenerative braking device is an electric traction system.

11. The regenerative braking system of claim 1 wherein when said vehicle is coasting or braking, delivery of air and fuel to said fuel cell stack is interrupted.

12. The regenerative braking system of claim 11 further comprising a controller.

13. The regenerative braking system of claim 12 wherein said controller sets a brake torque of said regenerative braking device as a function of vehicle speed.

14. The regenerative braking system of claim 12 wherein said controller modulates said bypass valve.

15. The regenerative braking system of claim 1 wherein said regenerative braking device is an electric traction system.

16. A regenerative braking system for a batteriless fuel cell vehicle, comprising:

a fuel cell stack;

an air compressor that provides air to said fuel cell stack;

a regenerative braking device coupled to at least one wheel of said vehicle and to said air compressor; and a bypass valve, wherein said air compressor is run at high pressure and high airflow to create an artificial load on said regenerative braking device, and wherein said artificial load is modulated by said bypass valve.

17. The regenerative braking system of claim 16 further comprising a back pressure valve for protecting said fuel cell stack when said air compressor is dissipating said power.

18. A method for operating a batteriless fuel cell vehicle, comprising the steps of:

providing a fuel cell stack;

providing air to said fuel cell stack using an air compressor;

coupling a regenerative braking device to at least one wheel of said vehicle;

connecting a regenerative braking device to said air compressor; and dissipating power that is produced by said regenerative braking device when said vehicle is traveling downhill using said air compressor.

19. The method of claim 18 further comprising the step of modulating a bypass valve to adjust said power that is dissipated by said air compressor.

20. The method of claim 19 further comprising the step of running said air compressor at high airflow and high pressure to create an artificial loss when said vehicle is traveling downhill.

21. The method of claim 20 further comprising the step of modulating a back pressure valve that is connected to an outlet of a cathode of said fuel cell stack to protect said fuel cell stack when said air compressor is run at said high airflow and high pressure.

22. The method of claim 19 further comprising the step of setting a brake torque of said regenerative braking device as a function of vehicle speed using a controller.

23. The method of claim 18 further comprising the step of interrupting delivery of air and fuel to said fuel cell stack when said vehicle is traveling downhill.

24. The method of claim 18 wherein said regenerative braking device is an electric traction system.

25. The method of claim 24 wherein said controller modulates said bypass valve.

* * * * *